United States Patent Office 3,142,706
Patented July 28, 1964

3,142,706
METHOD FOR THE PREPARATION OF METHYLATED DECABORANES
Clayton O. Obenland, Hamden, Conn., assignor to Olin Mathieson Chemical Corporation, a corporation of Virginia
No Drawing. Filed Dec. 2, 1960, Ser. No. 73,455
2 Claims. (Cl. 260—606.5)

This invention relates to a method for the preparation of methylated decaboranes by reacting a methyl halide with decaborane in the presence of an aluminum halide catalyst.

Copending application Serial No. 497,407 filed March 28, 1955 of Elmar R. Altwicker et al., issued as U.S. Patent No. 2,999,117 on Sept. 5, 1961, describes the preparation of alkylated decaboranes by reacting an alkyl halide with decaborane in the presence of an alkylation catalyst such as aluminum chloride and in the presence of a hydrocarbon solvent. In many relatively small scale reactions, n-pentane has proven to be a satisfactory solvent for the methylation of decaborane and no indications of reaction with the solvent have been noted. The operation of continuous methylation processes suggests, however, that the n-pentane solvent can react with the aluminum chloride catalyst under more extreme conditions of elevated temperatures and increased catalyst concentration to form unsaturated hydrocarbons and polymerization products including hexanes, heptanes and higher hydrocarbons, the reactions being promoted by the alkyl halide. The unsaturated hydrocarbons can react with the decaborane forming alkylated decaboranes of increased carbon content. Contamination of the methylated decaborane fuel with such alkylated decaboranes and higher hydrocarbons resulting from solvent reaction would be undesirable since such a fuel would have a higher carbon content and a reduced heat of combustion.

It has now been found that the methylation of decaborane by reaction of a methyl halide with decaborane using an aluminum halide catalyst will proceed satisfactorily in the presence of boron trichloride as a solvent with yields of methylated product, conversion of decaborane and product distribution among the various methyl derivatives approaching those obtained when n-pentane is employed as the solvent.

The method of this invention is illustrated in detail by the following examples:

EXAMPLE 1

The apparatus employed consisted of a stainless steel pressure vessel equipped with a condenser, two 0–200 p.s.i. gauges, one positioned above and one below the condenser, a rupture disk assembly positioned below the condenser to relieve sudden excessive pressure buildup, and a throttling valve positioned above the condenser for venting gas pressure to a hydrogen chloride absorber. The condenser was cooled to a temperature of about −25° C., i.e., low enough to minimize the escape of methyl chloride with the hydrogen chloride evolved during the alkylation. The total volume of the system was 1020 milliliters.

Into the pressure vessel containing an internal magnetized rod stirrer were charged 1 gram mole of decaborane of 95.5% purity, 0.5 gram mole of methyl chloride, 3 gram moles of boron trichloride and 0.05 gram mole of anhydrous aluminum chloride. The pressure vessel was attached to the system and the throttling valve was closed. The pressure vessel was then immersed in a stirred silicone oil bath which had been preheated to 75° C. by an immersion heater regulated by a temperature controller and stirring was begun. As heating and reaction took place, the pressure increased slowly and at a pressure of 100 p.s.i.g., the throttling valve was opened slightly, relieving gas pressure through the hydrogen chloride absorber. The valve was then adjusted to maintain a pressure of about 100 p.s.i.g. throughout the reaction period of 140 minutes.

At the expiration of the reaction time, the throttling valve was closed and the pressure vessel removed from the oil bath. It was then cooled by immersion in cold water. When the pressure vessel had been cooled to room temperature, any residual pressure was released through the HCl scrubber in order to collect hydrogen chloride. Subsequently the water from the scrubbers was titrated with standard sodium hydroxide to determine the amount of hydrogen chloride absorbed.

The pressure vessel was then detached from the system, the contents were poured on to a Buchner vacuum funnel and the aluminum chloride was filtered from the chloride solution of the products. The chloride solution was then distilled under reduced pressure to remove the methyl chloride and the boron trichloride. The residual material, crude product, unreacted decaborane, and occluded aluminum chloride, was slurried with about 500-ml. of n-pentane. After cooling the solution to Dry Ice temperature, the precipitated decaborane and residual aluminum chloride were filtered, leaving the crude product in the n-pentane. This procedure was repeated. The crude product was then separated by distillation of the n-pentane under reduced pressure. Finally the product was heated to 95° C. at 15 mm. to insure removal of solvent.

The amount of unreacted decaborane in the separated solids was determined by infrared analysis. The crude product was analyzed mass spectrometrically to determine composition in terms of weight percent of monomethyl-, dimethyl-, and trimethyldecaborane etc. and decaborane. With the data thus obtained, the conversion of decaborane and the theoretical amount of hydrogen chloride liberated were calculated.

The pertinent data from this and other examples are presented in Table I. In Example 4, the boron trichloride solvent was replaced by n-pentane for comparative purposes.

As disclosed in copending application Serial No. 497,407, various modifications can be made in the procedures of the specific examples. Thus in place of methyl chloride, methyl bromide or methyl iodide can be used and in place of aluminum trichloride, aluminum tribromide can be used. The relative proportion of methyl halide to decaborane is generally within the range of 1 to 6 moles of methyl halide per mole of decaborane, the reaction temperature generally ranges from about 0° to 150° C., and the reaction time varies from 5 minutes to 72 hours. Since boron trichloride is relatively volatile, the reaction advantageously is carried out under superatmospheric pressures sufficient to maintain the boron trichloride in liquid phase, i.e., pressures up to about 200 p.s.i.g. depending upon the reaction temperature. The proportion of boron trichloride solvent is not critical but in general ranges from about 1 to 10 moles of boron trichloride per mole of decaborane.

Table I

| Ex. No. | Reactants—Moles | | | | Reaction Conditions | | | Moles of HCl | | Wt. of Prod., g. | Product Composition—Wt. Percent | | | | | | Percent Conversion of $B_{10}H_{14}$ |
|---|---|---|---|---|---|---|---|---|---|---|---|---|---|---|---|---|---|
| | BX[a] | CH$_3$Cl | AlCl$_3$ | BCl$_3$ | Press., p.s.i.g. | Temp., °C. | Time, Min. | Meas. | Calc. | | BX[a] | MBX[b] | M$_2$BX[c] | M$_3$BX[d] | M$_4$BX[e] | M$_5$BX[f] | |
| 1 | 1 | 0.5 | 0.05 | 3 | 100 | 75 | 140 | 0.51 | 0.32 | 35 | 5 | 65 | 22 | 6 | 2 | | 23 |
| 2 | 1 | 0.5 | 0.05 | 3 | 120 | 75 | 120 | 0.44 | 0.31 | 36 | | 72 | 21 | 5 | 1 | 1 | 23 |
| 3 | 1 | 0.5 | 0.05 | 3 | 110 | 75 | 120 | 0.48 | 0.41 | 40 | | 71 | 22 | 5 | 1 | 1 | 30 |
| 4 | 1 | 0.4 | 0.05 | g 3 | 80 | 75 | 120 | 0.22 | 0.35 | 38 | 6 | 65 | 21 | 5 | 2 | 1 | 25 |

[a] BX=Decaborane.  [b] MBX=Monomethyl decaborane.  [c] M$_2$BX=Dimethyl decaborane.  [d] M$_3$BX=Trimethyl decaborane.
[e] M$_4$BX=Tetramethyl decaborane.  [f] M$_5$BX=Pentamethyl decaborane.  [g] n-Pentane.

I claim:

1. A method for the preparation of a methylated decaborane which comprises reacting decaborane and a methyl halide selected from the class consisting of methyl chloride, methyl bromide and methyl iodide while the reactants are in admixture with an alkylation catalyst selected from the class consisting of aluminum trichloride and aluminum tribromide and while the reactants are in admixture with boron trichloride as a solvent.

2. The method of claim 1 wherein the methyl halide is methyl chloride and wherein the alkylation catalyst is aluminum trichloride.

No references cited.